United States Patent [19]

Klein

[11] 4,407,549

[45] Oct. 4, 1983

[54] ANTI-SKID DEVICE FOR VEHICLES

[76] Inventor: George C. Klein, 102 W. Truman Dr., Holiday, Fla. 33590

[21] Appl. No.: 272,346

[22] Filed: Jun. 10, 1981

[51] Int. Cl.³ ................................................ B60T 7/02
[52] U.S. Cl. ..................................... 303/6 C; 60/591; 188/349
[58] Field of Search ................ 60/562, 581, 585, 589, 60/591; 188/16, 345, 349; 303/6 A, 6 C, 101, 113, 114, 117, 119

[56] References Cited

U.S. PATENT DOCUMENTS

| | | | |
|---|---|---|---|
| 2,190,981 | 2/1940 | Freeman | 188/349 X |
| 2,466,837 | 4/1949 | Bohr | 60/591 X |
| 2,911,263 | 11/1959 | Hill | 303/6 C |
| 2,985,487 | 5/1961 | Ayers | 303/6 C |
| 3,199,927 | 8/1965 | Bidlack et al. | 303/101 |
| 3,606,493 | 7/1969 | Schlitz et al. | 303/117 X |
| 4,258,958 | 3/1981 | Bloxham | 188/16 X |

Primary Examiner—Duane A. Reger
Attorney, Agent, or Firm—Watson, Cole, Grindle & Watson

[57] ABSTRACT

The present invention relates to a simple valve device capable of reducing hydraulic pressure to the front wheel brake cylinders of a vehicle to reduce the tendency of front wheel skidding.

4 Claims, 2 Drawing Figures

ANTI-SKID DEVICE FOR VEHICLES

Modern motor vehicles today are equipped with brakes on all four wheels. It is well known that at times, particularly when road surfaces are wet, covered with snow, or icy, braking of a vehicle with front and rear brakes can often result in vehicle skidding.

A vehicle in a skid can often be difficult to control and frequently places the vehicle and occupants in a dangerous situation. Generally the skidding occurs when braking action is hard. It has been appreciated in the past that often the skidding results from the braking action of the front wheel brakes. Where it is possible to reduce or eliminate the braking action of the front wheel brakes under slippery road conditions, improved control of the vehicle and reduced tendency to skid results.

One device which has attempted to reduce skidding of vehicles is that described in U.S. Pat. No. 3,431,028 to Yoder. However, this device is fairly complicated, is relatively expensive to manufacture and does not deactivate the front wheel brakes for a sufficiently long period of time when operational.

It is an object of the present invention to provide a modification to conventional four wheel braking systems having a dual master cylinder to reduce the tendency of the vehicles to skid during braking.

It is a further object of the present invention to provide a low cost, relatively simple device which can be readily installed in new as well as existing vehicles to reduce skidding when applying the brakes on slippery road surfaces.

The foregoing objects as well as other objects and advantages of the present invention will become more apparent upon reference to the following detailed specification taken in connection with the accompanying drawings in which.

According to the present invention, the valve apparatus of the present invention reduces the tendency to skid when the brakes are applied on wet, slippery, or icy roads in the operation of vehicles with a hydraulic dual master brake cylinder and a four wheel brake system.

The valve apparatus is a one way device which when operational, permits hydraulic fluid from the front wheel section of a master cylinder to recycle to the master cylinder reservoir. This reduces the pressure in the brake lines to the individual front wheel brake cylinders and prevents activation of the front wheel brakes. When in the non-operational position, the valve is closed and the brakes function as in normal operation.

Figure 1:
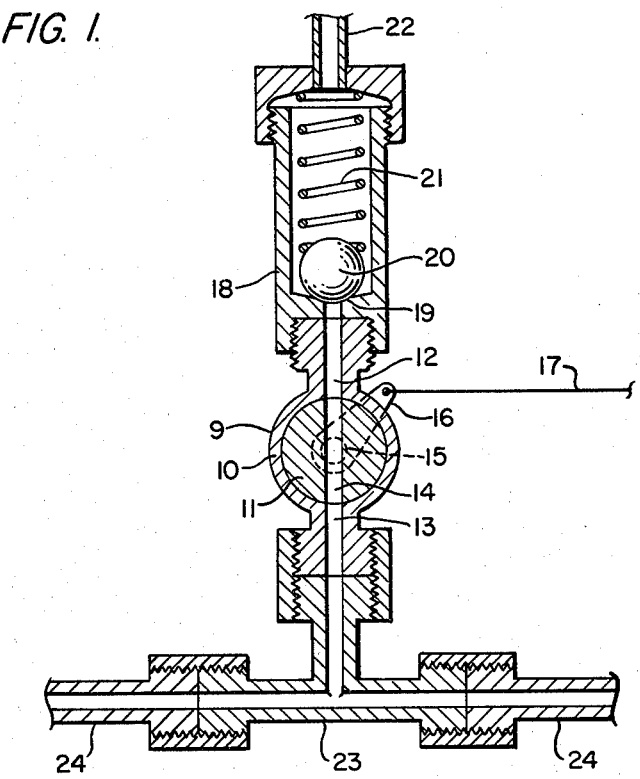
FIG. 1 is a cross-sectional view showing the by-pass valve of the present invention in relationship to the master brake cylinder.

Referring to the drawings in greater detail, in FIG. 1, 9 is a valve having a valve body 10 and valve core 11 rotatably located therein and orifices 12, 13 opposite each other on valve body 10. Valve core 11 has an axial bore 14 therethrough capable of alignment at each end with orifices 12, 13 in valve body 10. Mounted on a centrally located shaft 15 on valve core 11 and transverse to axial bore 14, on the outer face of valve body 10 is eccentric cam 16, the upper end of which is rotatably connected to rigid cable 17. The upper end of valve body 10 is threadably connected by common threaded connecting means to spring loaded check valve 18 having a valve seat 19, ball valve 20 and spring 21. Threadably connected to the upper end of check valve 18 is a hydraulic line 22. The lower end of valve body 10 is threadably connected to Tee connector 23 which in turn is threadably connected to and in line with the hydraulic brake line 24 from the front wheel section of the master cylinder to the front wheel brake cylinders.

Figure 2:
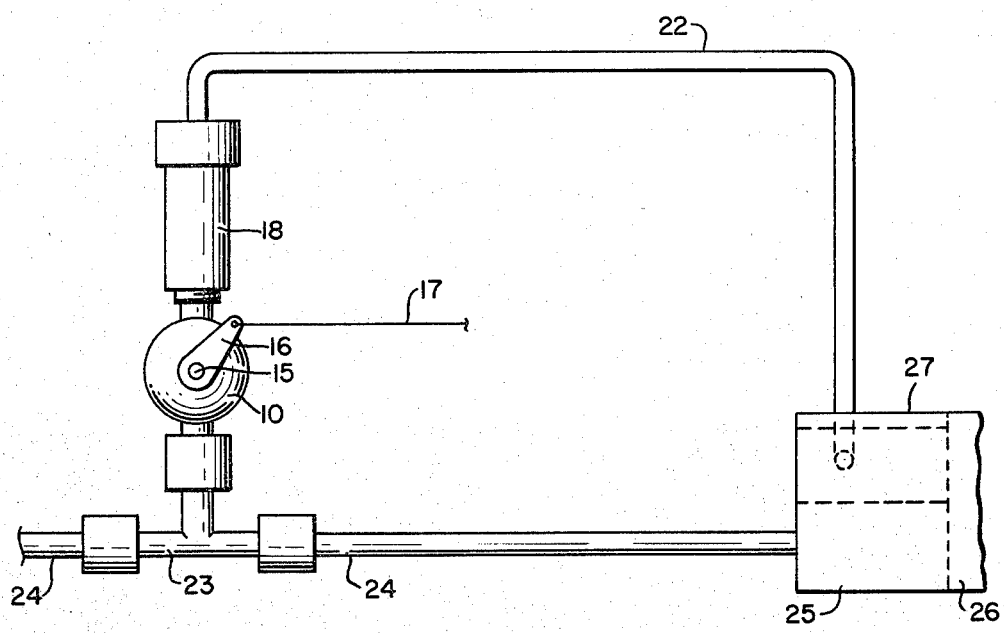
FIG. 2 is a schematic view showing the by-pass valve connected in a hydraulic brake system.

FIG. 2 sets forth the valve apparatus installed in line in a vehicle having a front wheel brake system. Valve body 10 is connected by Tee connector 23 to front brake line 24 which is connected at one end to the front wheel section 25 of master cylinder 26 and at the other end to the individual front wheel brake cylinders (not shown). The upper end of valve body 10 is connected to check valve 18 and hydraulic line 22. Hydraulic line 22 is open at the end opposite its connection to check valve 18 and is inserted through master cylinder reservoir cover 27 into the hydraulic brake fluid in said reservoir. Rigid cable 17 may be passed through the firewall and conviently located within the passenger compartment for ready access by the operator of the vehicle.

In operation, when road conditions so require, the operator may disengage the front wheel brakes by pulling rigid cable 17. Rigid cable 17 moves the upper end of cam 16 from a vertical position to contact cam stop means (not shown) and thereby align axial bore 14 of valve core 11 with openings 12, 13 in valve body 10 and place the valve in the operational mode. In this mode, when the brakes are applied, hydraulic fluid from front wheel section 25 of master cylinder 26 flows through line 24, Tee connector 23, opening 13, axial bore 14, opening 12, check valve 18 and line 22 back to the reservoir in master cylinder 26. The hydraulic pressure applied to the individual front wheel brake cylinders when valve 9 is operational is insufficient to activate the front wheel brakes.

Upon pushing rigid cable 17 forward, the operator of the vehicle can again make the front wheel brakes operational.

What is claimed is:

1. In a vehicle having a hydraulic brake system with front and rear wheel brakes actuated by separate reservoirs in a dual master brake cylinder and separate hydraulic circuit means to said front and rear wheel brakes, means to selectively deactivate said front wheel brakes after said front and rear wheel brakes have been activated, comprising a hydraulic by-pass circuit in said hydraulic circuit connecting said front wheel brake reservoir in said master brake cylinder to said front wheel brakes, said by-pass circuit having a by-pass valve as part thereof and being movable between an open position in which a quantity of fluid passes through said by-pass valve back to said master brake reservoir to substantially deactivate said front wheel brakes without deactivating said rear wheel brakes, and a closed position in which said by-pass valve is closed to passage of fluid and said by-pass circuit is inoperative.

2. In a vehicle as claimed in claim 1, the improvement wherein said front wheel by-pass circuit includes a check valve located between said by-pass valve and said front wheel master brake reservoir, said check valve permitting passage of fluid against spring pressure when said by-pass valve is open, thereby regulating the volume of fluid passing through said by-pass circuit.

3. In a vehicle as claimed as in claim 1, the improvement wherein said by-pass valve has a valve core with an axial bore extending therethrough and spaced orifices permitting inlet and egress of fluid, said by-pass valve being in open position when said bore is aligned with said orifices to permit the passage of fluid, and in closed position when said bore is not so aligned.

4. In a vehicle as claimed in claim 3, the further improvement wherein said by-pass valve core is in the form of a shaft manually rotatable between open and closed positions from within the vehicle.

* * * * *